Feb. 23, 1937. W. BÜNGNER 2,071,967
RECORDING INSTRUMENT
Filed Aug. 17, 1936
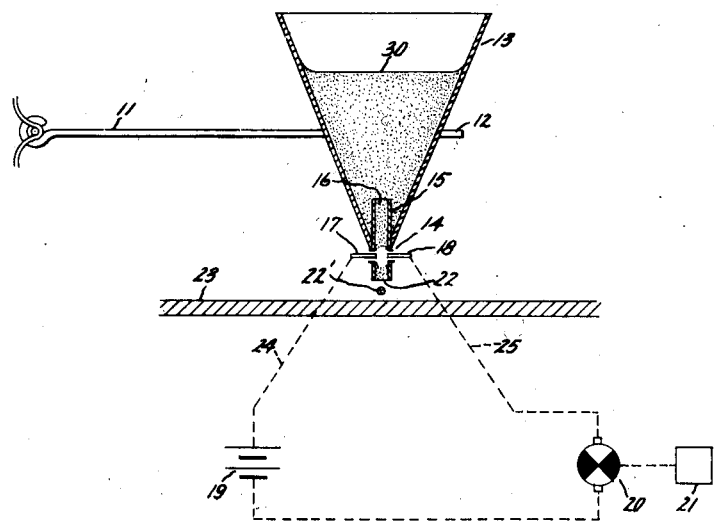
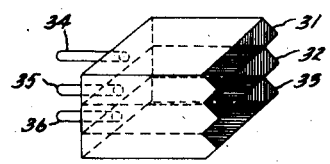
Inventor:
Wilhelm Büngner,
by Harry E. Dunham
His Attorney.

Patented Feb. 23, 1937

2,071,967

UNITED STATES PATENT OFFICE 2,071,967

RECORDING INSTRUMENT

Wilhelm Büngner, Berlin-Tempelhof, Germany assignor to General Electric Company, a corporation of New York Application August 17, 1936, Serial No. 96,497
In Germany August 19, 1935

3 Claims. (Cl. 234—1.5)

My invention relates to recording instruments and concerns particularly marking arrangements for such instruments.

Recording instruments are well known in which an ink-holding pen is utilized to draw a continuous ink line on the record chart. Such pens remain continuously in contact with the chart and necessarily introduce a certain amount of friction, resisting motion of the indicating arm of the instrument. In order to overcome such friction, marking arrangements have been employed in which a stylus is carried by the moving arm out of contact with the record chart but is struck against the chart intermittently to produce a dotted record. In the latter case, an inked ribbon or other suitable marking material is ordinarily interposed between the stylus and a platen and the chart for the purpose of depositing marking material. The repeated striking operations against the stylus have certain disadvantages, including the fact that the stylus may gradually become bent, thus impairing the accuracy of the curve produced.

It is an object of my invention to provide an improved marking arrangement for recording instruments in which there is no friction between the marking member and the record chart and in which even intermittent resistance to the deflection of the indicating arm is eliminated.

Other and further objects and advantages will become apparent as the description proceeds.

In accordance with my invention in its preferred form, I provide a cone-shaped or funnel-shaped receptacle for ink or other marking fluid at the end of an indicating arm of a recording instrument and I provide an arrangement for expelling ink from the tip of the cone intermittently against the record chart.

The invention will be understood more readily from the following detailed description when considered in connection with the accompanying drawing and those features of the invention which are believed to be novel and patentable will be pointed out in the claims appended hereto. In the drawing, Fig. 1 is a schematic diagram representing, partially in section, one embodiment of my invention, and Fig. 2 is a perspective view of a triple ink receptacle for use in producing multiple records of different colors. Like reference characters are utilized in the drawing to designate like parts throughout.

Referring now more in detail to the drawing, I have shown a deflecting arm 11 of a recording instrument carried by a suitable torque-producing or rotatable element, not shown, of a type usual in measuring and recording instruments. The free end of the deflecting arm 12 carries a receptacle 13 for ink or other marking fluid, or other marking material such as fusible powder. The receptacle 13 is conical in shape, preferably supported with its axis vertical and its apex downward. There is an opening in the apex 14 and preferably a fine tube 15 is inserted in the apex 14 to serve as the outlet for the receptacle 13. The tube 15 is of such dimensions as to have a capillary opening 16 therethrough. A pair of electrodes 17 and 18 is inserted in the tube 15 and the electrodes 17 and 18 are connected to a source of current 19 by a suitable switch 20, preferably a switch adapted to make intermittent contact, such as a rotary switch driven by a motor 21.

It will be understood that the marking fluid receptacle 13 is supported with the open end 22 of the tube 15 adjacent but slightly spaced from the record chart on which the measurements are to be recorded. Such a chart is represented fragmentarily at 23. It will also be understood that, for the sake of clarity, the receptacle 13 is shown in a size out of proportion with the size and length of the deflecting arm 11.

It will be understood that conductors 24 and 25 for making the current connections to the electrodes 17 and 18 are carried along the arm 11 and that a suitable arrangement, such as flexible leads or sliding contacts, is provided for completing the connection from the movable arm to the stationary current source 19.

The record is produced on the record chart in the following manner:

Each time the switch 20 closes a circuit, a spark occurs in the gap between the electrodes 17 and 18 and the production of gas or vapor in the tube 15 expels a minute drop 22' of marking fluid from the mouth of the outlet or from the opening 22 against the record chart 23. Owing to the mass of marking fluid 30 above the tube 15, no fluid is expelled in the upward direction.

The necessity for changing the marking rollers or ribbons in the usual multicolor marking devices when it is desired to produce record curves in different colors may be overcome by employing a multiple receptacle for the marking fluid, as shown in Fig. 2. The receptacle shown in Fig. 2 is divided into three compartments 31, 32, and 33, each containing a marking fluid of a different color and each having its individual capillary tube 34, 35, and 36, respectively, through which marking fluid is expelled in response to the occurrence of an electric spark, as explained in connection with the apparatus of Fig. 1. The electrodes 17 and 18 are not shown in Fig. 2, but it will be understood that similar electrodes are employed. It will likewise be understood that either separate control switches, similar to switch 20, will be employed for controlling the expulsion of marking fluid from the receptacle tubes 34, 35, and 36, or a suitable selector switch will be used for causing the desired color of ink to be expelled. Such a selector switch may, of course, be made responsive to the quantity being recorded. In order to minimize the displacement in the time axis of the record curves produced by the marking fluid from different compartments, 31, 32, and 33, these are preferably placed as close together as possible and, if desired, the unavoidable spacing between the tubes 34, 35, and 36 may be taken into consideration in reading the different colored record curves.

It will be understood that the electrodes 17 and 18 are to be so arranged in the tube 15 as not to cause any possibility of stoppage of the opening. The fact that the tube 15 extends into funnel 13 guards against any excess of fluid being allowed to escape from the funnel 13. Either the capillary tube 15 or the funnel 13, or both, may, if desired, be composed of an insulating material.

The arrangement described produces a clear, distinct line of dots without offering any restraint to the deflection-producing mechanism. Unnecessary flow or suction of ink, as well as smearing, is eliminated, and the ink dots can dry quickly and easily. My arrangement also eliminates the possibility of laceration of the record strip such as may occur in apparatus in which spark discharges are struck through the paper.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A recording instrument comprising in combination, a movable indicating arm, a receptacle for marking fluid carried by said arm and having an opening in the lower end thereof, a tube inserted in said opening, a pair of electrodes within said tube, and means for intermittently producing a spark discharge between said electrodes.

2. A marking arrangement for recording instruments comprising in combination, a receptacle for marking fluid having a restricted elongated outlet therein, a pair of spaced electrodes in said outlet spaced from the mouth thereof and means for producing a spark discharge between said electrodes.

3. A marking arrangement for recording devices comprising in combination a receptacle for marking material, said receptacle having an opening therein, a capillary tube occupying the opening so as to extend into and out from said receptacle, a pair of electrodes in said tube spaced from each other to leave clear passage through said tube, and spaced from the outer end of the tube to provide space for a charge of marking material between said electrodes and the outer end of said tube, and means for intermittently producing spark discharges between said electrodes to vaporize adjacent marking material and expel charges of marking material from said tube.

WILHELM BÜNGNER.